United States Patent [19]

Ault et al.

[11] Patent Number: 4,823,359
[45] Date of Patent: Apr. 18, 1989

[54] FURNANCE HAVING DENSE REFRACTORY OXIDE LINER

[75] Inventors: Neil N. Ault, Holden; Anthony K. Butkus, Worcester; Louis J. Trostel, Princeton, all of Mass.

[73] Assignee: Norton Company, Worcester, Mass.

[21] Appl. No.: 125,092

[22] Filed: Nov. 25, 1987

Related U.S. Application Data

[63] Continuation of Ser. No. 855,973, Apr. 25, 1986, abandoned.

[51] Int. Cl.$^4$ .................... C04B 35/10; C04B 35/12
[52] U.S. Cl. ......................................... 373/137; 373/27; 373/155; 373/162; 373/164; 264/30; 432/264; 432/265; 432/248; 501/127; 501/132
[58] Field of Search ............... 501/127, 132; 432/264, 432/265, 248; 373/27, 137, 155, 162, 164; 65/374.14; 264/30

[56] References Cited

U.S. PATENT DOCUMENTS

| | | | |
|---|---|---|---|
| 2,279,260 | 4/1942 | Benner et al. | 501/115 |
| 2,911,313 | 11/1959 | Sandmeyer | 501/132 |
| 3,093,498 | 6/1963 | Whittemore et al. | 501/119 |
| 3,684,262 | 8/1972 | Busby | 432/248 |
| 3,888,687 | 6/1975 | Manigault | 501/127 |
| 3,948,670 | 4/1976 | Manigault | 501/127 |
| 4,125,407 | 11/1978 | Ueno | 501/127 |
| 4,125,409 | 11/1978 | Friedrichs et al. | 501/131 |
| 4,126,654 | 11/1978 | Montgomery et al. | 264/63 |
| 4,217,113 | 8/1980 | Suh et al. | 51/309 |
| 4,222,782 | 9/1980 | Alliegro et al. | 501/105 |
| 4,235,636 | 11/1980 | Friedrichs et al. | 501/132 |
| 4,544,643 | 10/1985 | Fraser | 501/127 |
| 4,637,823 | 1/1987 | Dach | 432/248 |

FOREIGN PATENT DOCUMENTS 47-10045  3/1972  Japan ................................ 501/127

OTHER PUBLICATIONS

J. Amer. Ceram. Soc., v. 50, No. 1, pp. 54–55, R.C. Bradt Jan. 1977.

*Primary Examiner*—William R. Dixon, Jr.
*Assistant Examiner*—Karl Group
*Attorney, Agent, or Firm*—Arthur A. Loiselle, Jr.

[57] ABSTRACT

A refractory product is shown in the form of a dense sintered alumina-chromia, zirconia-alumina-silica, zirconia-alumina body, or zirconia-chromia-alumina having less than about 8% of homogeneously distributed closed porosity formed by sintering an intimate interdispersion of fine particles of alumina-chromia, zirconia-alumina-silica, zirconia-alumina, or zirconia-chromia-alumina.

6 Claims, 1 Drawing Sheet

FURNACE HAVING DENSE REFRACTORY OXIDE LINER

This application is a continuation of application Ser. No. 855,973, filed Apr. 25, 1986, abandoned.

TECHNICAL FIELD

This invention relates to a hot pressed dense refractory product and more particularly to a dense sintered alumina-chromia, zirconia-alumina-silica, zirconia-alumina, or zirconia-chromia-alumina brick for use in glass melting furnaces and furnaces for containing slag produced during the furnacing operations.

BACKGROUND AND INFORMATION DISCLOSURE STATEMENT

The following U.S. patents are representative of the most relevant prior art known to the applicant at the time of the filing of this application:

| | | |
|---|---|---|
| 2,279,260 | Benner et al | April 7, 1942 |
| 2,911,313 | Sandmeyer | November 3, 1959 |
| 3,093,498 | Whittemore et al | June 11, 1963 |
| 3,888,687 | Manigault | June 10, 1975 |
| 3,948,670 | Manigault | April 6, 1976 |
| 4,125,407 | Ueno | November 14, 1978 |
| 4,125,409 | Friedrichs | November 14, 1978 |
| 4,126,654 | Montgomey et al | November 21, 1978 |
| 4,217,113 | Suh et al | August 12, 1980 |
| 4,222,782 | Alliegro et al | September 16, 1980 |
| 4,235,636 | Friedrichs et al | November 25, 1980 |

A refractory liner is needed in gasifier furnaces used for converting coal or petroleum coke or other ash containing sources of carbon into methane for use in the chemical industries and in glass melting furnaces. While somewhat satisfactory liners are used today, the slag produced from melting various impurities in the source of the carbon in such furnaces, have been found to be very difficult to contain. The conventional refractory liners for such furnaces now have as much as 20% porosity in the form of interconnected passages into which the molten slag and glass penetrate to ultimately mechanically and chemically weaken the liner structure causing it to crack, spall, and erode.

It is therefore desireable that an improved refractory liner be made available, e.g. for gasifier furnaces, that is more resistant to the corrosive and erosive action of slag, and which in addition to being able to contain the chemically reacting carbon compositions and the slag generated as the gasification process continues, also serves as an efficient thermal barrier at the furnace wall when the liner is subjected to temperatures in the range of from 500° C. to 1800° C.

It is the purpose of this invention to provide an improved refractory liner material in the form of an alumina-chromia solid solution that can stand up to the high temperature conditions and the chemical and mechanical slag and molten glass containment problems. For this purpose the present disclosure encompasses a unique, uniformly dense, alumina-chromia solid solution refractory product that is better adapted to contain the molten glass and slag generated in the operation of gasifier furnaces. The tile or brick described herein has a composition that is chemically and mechanically resistant to the corrosive and debilitating action of the slag as well as providing a satisfactory thermal barrier for lining the furnace. The method of forming and firing the tile is also disclosed.

Concerning the above mentioned prior art, the patents to Benner et al and Sandmeyer show examples of products making use of a fusion process to make alumina-chromia solid solutions. Benner et al forms such a refractory product by fusing alumina and naturally occurring chromite together. In his final product the impurities present in the chromite ore are distributed throughout the body of the refractory. It is proposed that not more than 20% of the fused mass be formed of spinel and his invention is concerned with the control of the level of the impurities to counter the spinel or glassy phase impurities in interstitial areas.

Sandmeyer shows a similar fused cast alumina-chromia solid solution product which in his disclosure is said to be useful for refractory purposes. He first roasts his chromite ore and then fuses that chromite ore with alumina. This, it is said, leads to a denser product which has fewer shrinkage cavities and yet as shown in FIG. 1 of his patent, a rather large cavity and several smaller cavities appear within the cast body.

The two Manigault, Friedrichs '409, and the Montgomery et al patents all teach the manufacture of refractory products which are made with mixtures of rather coarse alumina particles together with chromia and usually other impurities. Manigault, for example, uses tabular alumina grains that fall in a size range of smaller than one quarter of an inch but larger than 325 mesh. He also discusses the presence of a phosphate compound, zircon, clay, and phosphoric acid in the mix he fires to produce his product.

Likewise Friedrichs '409 discloses a refractory product having an alumina matrix that may include tabular alumina to form a matrix to support a solid solution of alumina-chromia in a refractory ramming cement. The large sized alumina grains falling in the range of 4 to 60 mesh and larger if tabular alumina is used, are predominant in the mix and form a strong skeletal structure. The product also includes a glassy phase to form a seal for closing pores and shrinkage cracks. Also a phosphate is used in conjunction with plastic clay to form a preliminary binder to hold the ramming cement together during the firing process.

Montgomery shows an alumina-chromia mixture formed by combining 16 to 54 Tyler mesh alumina grains and chromium metal powder bonded with calcium aluminate. A molded mass of such a mix is then fired to form chrome oxide in-situ. Also an alumina-chromia mix together with chromium powder can be made and bonded with calcium aluminate and then fired.

Suh, Alliegro, and Friedrichs '636 all show other variations of an alumina-chromia fired product. Suh, for example, describes a ceramic tool made by operating upon alumina particles and a reactive chromium metal component to form a multi-phase alumina-chromia composition. The ultimate structure is described as a macrostructure of aluminum oxide which is homogeneous and a microstructure which is non-homogeneous wherein there are ceramic phases.

Alliegro describes a ramming mix that includes alumina-chromia particles in a size range of 4 to 16 mesh and aluminous powder that is oxidized in-situ. The powder is held in its rammed position with a glassy phase alumina-clay constituent and the resulting fired product is described as having as much open porosity as 17% by volume.

Friedrichs '636 shows the use of an essentially alumina-chromite grog that upon being fired forms an alumina-chromia solid solution having all the chromite impurities dispersed therethrough. This fired mass is then crushed to a size range of −3 to 140 mesh grains and is mixed with more chromite in a size range of under 325 mesh and finely ground alumina having a size under 325 mesh. This mixture of larger mesh fused and crushed chromite and the subsequently added fine mesh chromite and alumina is sintered and the fine mesh chromite and alumina form a solid solution matrix and bond between the previously crushed and larger sized grog particles.

Whittemore et al, so far as that reference is relevant to the present invention, discloses a hot-pressed aluminum oxide product which may include, inter alia, chromium oxide. The reference states that the alumina product may contain up to 2% of $Cr_2O_3$ or even more, forming a solid solution with the alumina. There is no teaching of anything close to the 10% minimum of the present invention, and it suggests that the material is useful as a cutting tool not a refractory for retaining slag in such an application as a coal gasifier.

In the examples of cements and cold pressed and sintered tiles or bricks, the products are made with mixtures of coarse and fine grains and the coarse grains retain their identity such that a homogeneous body structure does not exist and there are large grains of at least one phase. In the example of fused cast tiles and bricks, the materials are fused into a homogeneous liquid, but in the cooling cycle of the fused cast product, large crystals are formed in the cooling cycle and because of volume changes, large pores are also present. In fused cast, chromia-alumina will be a solid solution of the two oxides, but the crystal size of the solid solution will be well above 200 microns.

In the prior art examples above, various refractory components are segregated within the mass of the resulting products such that a homogeneous body structure does not exist, or a product with large pores and large crystals is obtained. Large crystals are undesirable in such a product because of the anisotropy of the crystals which create differential thermal expansion within the body making it more susceptible to thermal shock.

Fused cast refractories also are nonhomogeneous in that the grain size and grain shape vary from one part of the structure to another as the result of the cooling process. More particularly it has been found when making sintered products, that whenever grain sizes of an alumina component are substantially larger than 150 U.S. Standard mesh, that usually such grains of alumina sinter to form a matrix or skeletal structure that is a separate and distinct phase provided to support the other components in the final product. It is to be noted that when chromite and other less pure particles are used as the source of the chromia, that the impurities form glassy zones or weak spots between the sintered particles of the resulting product, which impurities are subject to chemical attack by the molten slag and are subject to being washed away by the action of the molten slag of the type found in a gasifier furnace or the like.

As distinguished from such known refractory products, this invention provides refractory bodies that are dense alumina-chromia, zirconia-alumina-silica, zirconia-alumina, or alumina-chromia-zirconia which have grain sizes less than 50 microns and less than 8% total pores throughout their masses.

BRIEF DESCRIPTION OF THE INVENTION

The refractory bodies here shown provide high density alumina-chromia, zirconia-alumina-silica, zirconia-alumina-chromia, and zirconia-alumina bodies wherein high purity oxides are processed in a manner to form dense, small grained, uniform structures. Making use of mixtures of such oxides, each oxide ground to a very fine particle size i.e. 50 microns or less, and placing the respective particles in intimate position, the one relative to the other, produces raw batches that may be hot pressed under controlled conditions to produce dense bodies of uniform structure with small grain size. When properly fired, the products of this invention will be of relatively high density and have a homogeneous distribution of grains 50 microns or less and less than about 8% closed pores throughout their masses. Such dense refractory bodies have been found to be particularly resistant to the effects of erosion and corrosion produced by slag and molten glass against the walls of a furnace, and also provide a refractory liner well adapted to contain the high operating temperatures of the furnace.

The products of the present invention are fine grained, sintered oxide mixtures within the following weight percent compositional ranges:

| Composition | $Al_2O_3$ | $Cr_2O_3$ | $ZrO_2$ | $SiO_2$ |
| --- | --- | --- | --- | --- |
| A | 10–90 | 90–10 | | |
| B | 10–90 | 90–10 | 0–40 | |
| C | 10–90 | | 5–70 | 5–40 |
| D | 10–90 | | 90–10 | |

Zirconia/silica = 1.5 to 2.5

The sintering of the particulate mixtures may be facilitated by cold forming the green product followed by heat treating at atmospheric pressure at a temperature high enough to cause the particles to sinter and form a solid solution. Alternatively and preferably, the products may be formed by the so-called hot pressing method, i.e. placing the mixture of oxides in a graphite die and simultaneously applying heat and pressure to bring about densification. While the production of oxide based refractory products with 92% of theoretical density is difficult by the cold-press and sinter method, it can be done. The prior art, however, does not disclose the use of such refractory products as a liner in a furnacing operations involving glass or slag.

DRAWINGS

EXAMPLE OF THE PREFERRED EMBODIMENTS

Figure 1:
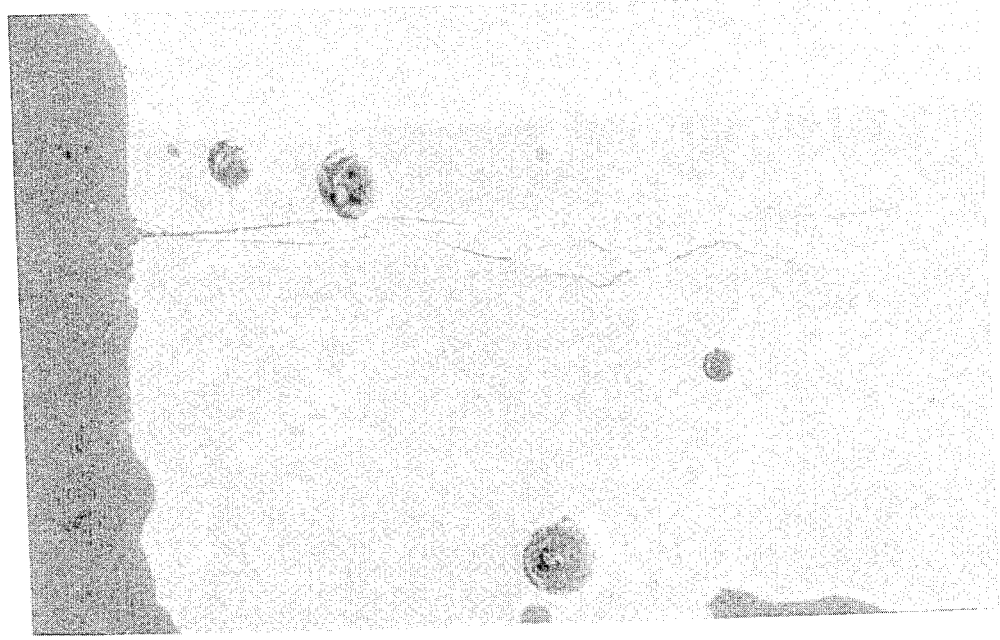
FIG. 1 is a photomicrograph of a crossection of a tile of this invention, showing a solidified mass of slag in contact with but with no penetration below the surface of a refractory.

Chromia containing refractory surfaces have been found to be particularly useful for containing the slags produced in the usual gasifier furnaces typically used for producing methane from coal, petroleum coke, and other carbon containing sources as well as in glass processing furnaces. But, such slag has been found to be very corrosive when it is dispersed into the interconnected pores found in the bodies of the usual sintered brick liners or rammed refractory liner materials that are fired in-situ. It has been found that such refractory furnace liners spall, crack, and erode after a relatively short period of use, requiring frequent costly shut down of the furnace for repairs and maintenence.

It has now been discovered that when fine, substantially pure alumina particles are fired together with fine, substantially pure chromia particles under proper temperature and atmospheric conditions, a refractory body is formed that is a dense alumina-chromia solid solution. When the uniform co-dispersion of these particles is hot pressed during the firing routine, a dense body with a homogeneous dispersion of less than about 8% of minute closed pores results. A gasifier furnace, for example, may be lined with bricks made of such a refractory body to provide an improved wall surface that resists slag penetration and also exhibits excellent thermal stability.

The preferred body is made from alumina that is at least 98% pure. Calcined alumina that has been finely ground so that all the particles pass through a 325 mesh U.S. Standard sieve has been used for making the refractory shown in FIG. 1. This alumina particulate material was codispersed with particles of a light green pigment grade chromium oxide. The chromia was specified to be at least 98% pure. Substantially all of this chromia was ground to pass through a 325 mesh U.S. Standard Sieve.

The alumina and chromia particles were mixed in proportions of from 10% chromia and 90% alumina to 90% chromia and 10% alumina.

The selected particles of chromia and alumina must be thoroughly interdispersed before the green refractory product is molded and any suitable mixing procedure may be used. It has been found that a high energy shearing method can be used by dispersing the particles in isopropyl alcohol or de-ionized water. After processing with this method, the interdispersed particles were first dried in an oven and the mixture screened through a 325 mesh U.S. Standard sieve for further processing. Alternatively, a mechanically activated dry grinding mill may be used. It is, of course, essential that whatever mixing process is used, that the interdispersion of the fine alumina particles and the chromia particles be as complete and uniform as possible, the mix being screened after this process to preferably pass through a 325 mesh U.S. Standard sieve.

After the mixture had been completed, the blended particles were loaded into a graphite mold and compacted. The mold and its charge were then placed in an induction furnace and the mixture in the mold placed under a pressure of approximately 1.5 tons per square inch. The interdispersed and pressed particles were heated to a temperature of about 1600° C. and held soaking for a time depending upon the size of the refractory being made to cause all of the alumina and chromia particles to enter into a solid solution. The completed refractory was then allowed to cool to room temperature and removed from the mold.

A mix of 10% chromia and 90% alumina was found to have a fired density of 4.09 g/cc as compared with a theoretical density of 4.09 g/cc for such a mix.

Other products of identical size were similarly made in the proportions of 90% chromia with 10% alumina and 75% chromia and 25% alumina. These products showed densities of 4.7 g/cc and 4.76 g/cc respectively, compared with their theoretical densities calculated to be 5.09 g/cc and 4.9 g/cc, which corresponds to a total porosity 7.7% and 2.9% respectively. The grain sizes of these products were typically 10 to 20 microns.

A sample brick or tile element made with a 75% chromia and 25% alumina mix 2" thick and measuring 6" by 6" on its sides was sintered under 1.5 tons per square inch at a temperature of 1600° C. for a period of 30 minutes. Such a tile was found to have a density of 4.76 g/cc as compared with a theoretical density of 4.9 g/cc. This fired refractory was then subjected to a siliceous molten slag utilizing the A.S.T.M. Standard Drip Slag Test C768, the slag being a worst-case black mesa coal slag which is an after product of coal gasification that is a particularly corrosive and erosive slag. The test was run at a temperature of 1570° C. for 6½ hours. Only a very slight surface erosion was noted upon completion of the test.

The sample tested was sectioned after the test was completed and the sample was polished and a photomicrograph was made in an electron microscope. FIG. 1 is that photomicrograph and shows the slag as it solidified on the refractory with no penetration.

Figure 2:
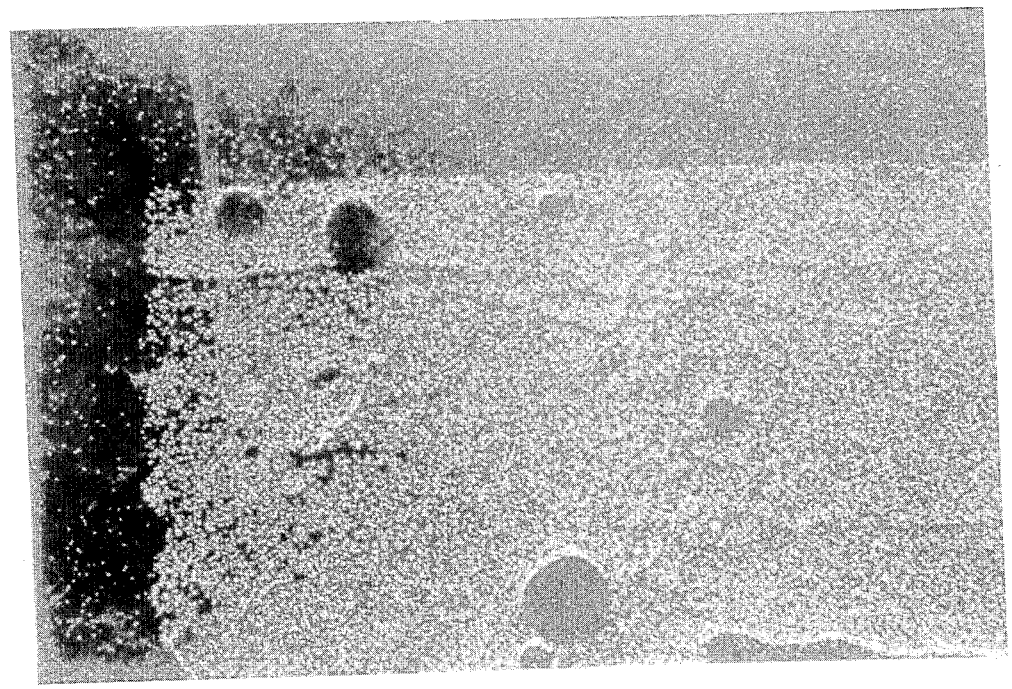
FIG. 2 is a silica-calcia map generated by energy dispersive spectroscopy of the test area of the refractory shown in FIG. 1, confirming the lack of penetration by the calcia rich slag.

FIG. 2 shows a silica, calcia map that was generated by an energy dispersive spectroscopic technique applied to the same area as that shown in FIG. 1. Silica and calcia are the major constituents found in gasifier furnace slag which is known to penetrate prior art cold pressed 80% dense alumina refractory furnace liners. As shown in FIG. 2, such deleterious penetration does not occur with a dense, 75% chromia, 25% alumina solid solution refractory is made as here disclosed. Such porosity as may exist, is uniformly dispersed throughout the mass of such a refractory in the form of minute closed pores.

The refractory is molded and fired in the form of bricks adapted to be fitted together within the furnace chamber to surround the area for containing the slag.

The above description is based on the best mode known to the inventor at the present time and is not to be considered limiting. The refractory defined in the following claims is of particular value for containing slag such as is found in gasifier furnaces for producing methane but it is obvious that it can be used for other slags and especially where high furnace temperatures make the slags and glasses particularly corrosive.

We claim:

1. A furnace for melting glass or gasifying coke and coal wherein the improvement comprises:
   a furnace lining consisting essentially of a sintered mixture of particulate oxides wherein the oxides are at least 98% pure, said lining is at least 92% of its theoretical density with the porosity present being non-continuous and uniformly distributed throughout the lining, and said mixture of oxides is made up of 10% to 90% alumina and 90% to 10% chromia.

2. The furnace of claim 1 wherein all of said particles of said oxides prior to sintering fall within a size range of 50 microns or less.

3. The furnace of claim 1 wherein said lining is constructed of bricks that have been hot pressed under a pressure of 1.5 tons per square inch at a temperature of about 1600° C.

4. The furnace of claim 1 wherein said mixture of oxides prior to sintering is formed by suspending said particles in a fluid and performing a high energy shearing action on the particles in the fluid suspension causing intimate and uniform dispersion of the particles throughout the fluid, and drying mixture so formed prior to the performance at said sintering step which is done by hot pressing.

5. The furnace of claim 1 wherein said mixture of oxides is rendered finely pulverized and intimately mixed by dry milling prior to sintering.

6. The furnace of claim 1 wherein said lining is constructed of bricks made by compressing said mixture of particulate oxides at room temperature followed by heat treating at about 1600° C. at atmospheric pressure.

* * * * *